US012629767B2

(12) United States Patent
Nakada et al.

(10) Patent No.: US 12,629,767 B2
(45) Date of Patent: May 19, 2026

(54) FRICTION STIR WELDING APPARATUS AND FRICTION STIR WELDING METHOD

(71) Applicant: TOYOTA JIDOSHA KABUSHIKI KAISHA, Aichi-ken (JP)

(72) Inventors: Koki Nakada, Toyota (JP); Osamu Yamashita, Toyota (JP); Ryusuke Hioki, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 19/043,523

(22) Filed: Feb. 3, 2025

(65) Prior Publication Data

US 2025/0249529 A1     Aug. 7, 2025

(30) Foreign Application Priority Data

Feb. 7, 2024    (JP) ................................. 2024-017514

(51) Int. Cl.
B23K 20/12        (2006.01)
B23K 20/26        (2006.01)

(52) U.S. Cl.
CPC .............. B23K 20/12 (2013.01); B23K 20/26 (2013.01)

(58) Field of Classification Search
CPC ................... B23K 20/122–1295; B23K 20/26
USPC .............................. 228/112.1–114.5, 2.1–2.3
See application file for complete search history.

(56) References Cited

U.S. PATENT DOCUMENTS

| | | | | |
|---|---|---|---|---|
| 6,050,475 A | * | 4/2000 | Kinton ................. | B23K 20/121 228/2.1 |
| 2010/0006622 A1 | * | 1/2010 | Smith ................ | B23K 20/1265 228/2.1 |
| 2025/0249529 A1 | * | 8/2025 | Nakada .................. | B23K 20/12 |

FOREIGN PATENT DOCUMENTS

| | | | | | |
|---|---|---|---|---|---|
| CN | 1491770 A | * | 4/2004 | .......... | B23K 20/125 |
| CN | 102528275 B | * | 12/2013 | | |
| CN | 103335768 B | * | 5/2015 | | |
| CN | 107116299 A | * | 9/2017 | ........ | B23K 20/1245 |
| CN | 110802317 A | * | 2/2020 | ........ | B23K 20/1245 |
| CN | 111185661 A | * | 5/2020 | ........... | B21J 15/027 |
| CN | 113001006 A | * | 6/2021 | ........... | B33Y 30/00 |
| CN | 113001008 A | * | 6/2021 | ........ | B23K 20/1245 |
| CN | 116329732 A | * | 6/2023 | ........ | B23K 20/1245 |
| CN | 116900469 A | * | 10/2023 | ........... | B23K 20/26 |
| CN | 117943674 A | * | 4/2024 | ........... | B23K 20/26 |
| CN | 118893300 A | * | 11/2024 | ........... | B23K 37/00 |
| CN | 119328288 A | * | 1/2025 | ........... | B33Y 30/00 |
| CN | 119457399 A | * | 2/2025 | ........... | B33Y 30/00 |
| JP | 2021171775 A | * | 11/2021 | | |

(Continued)

*Primary Examiner* — Kiley S Stoner
(74) *Attorney, Agent, or Firm* — HAUPTMAN HAM, LLP

(57) ABSTRACT

A friction stir welding apparatus includes: a welding tool; a spindle housing covering a spindle connected to the welding tool; a plurality of roll members provided on the spindle housing; and a guide rail for guiding the welding tool in a predetermined direction by contacting any of the roll members among the plurality of roll members and a guide surface of the guide rail. Further, the plurality of roll members is arranged in a manner that, when viewed from an axial direction of the welding tool, a distance from an axis of the welding tool to a position where one of the roll members is in contact with the guide surface is different from a distance from the axis of the welding tool to a position where another roll member is in contact with the guide surface.

5 Claims, 6 Drawing Sheets

(56)     References Cited

FOREIGN PATENT DOCUMENTS

JP           7212124  B1     1/2023
JP         2023063788  A   *   5/2023

* cited by examiner (a)

(b)

(a)

(b)

FRICTION STIR WELDING APPARATUS AND FRICTION STIR WELDING METHOD

CROSS-REFERENCE TO RELATED APPLICATION(S)

The present application claims priority to and incorporates by reference the entire contents of Japanese Patent Application No. 2024-017514 filed in Japan on Feb. 7, 2024.

BACKGROUND

The present disclosure relates to a friction stir welding apparatus and a friction stir welding method.

Japanese Patent No. 7212124 discloses a friction stir welding method in which a cylindrical welding tool is provided in an articulated robot arm, and friction stir welding is performed in which a softened portion of a member to be joined is agitated by frictional heat generated by rotating a welding tool to perform friction stir welding in which overlapped members to be joined are joined, and a friction stir welding apparatus.

SUMMARY

There is a need to provide a friction stir welding apparatus and a friction stir welding method capable of performing friction stir welding for the same member to be bonded multiple times by easily shifting the locus of the welding.

According to an embodiment, a friction stir welding apparatus includes: a welding tool; a spindle housing covering a spindle connected to the welding tool; a plurality of roll members provided on the spindle housing; and a guide rail for guiding the welding tool in a predetermined direction by contacting any of the roll members among the plurality of roll members and a guide surface of the guide rail. Further, the plurality of roll members is arranged in a manner that, when viewed from an axial direction of the welding tool, a distance from an axis of the welding tool to a position where one of the roll members is in contact with the guide surface is different from a distance from the axis of the welding tool to a position where another roll member is in contact with the guide surface.

BRIEF DESCRIPTION OF THE DRAWINGS

Part (a) of FIG. 1 is a diagram illustrating a state in which the friction stir welding apparatus according to a first embodiment, to join two workpieces by a first friction stir welding;

Part (b) of FIG. 1 is a view of a welding tool in a process of performing the first friction stir welding from an axial line AX;

Figure 2:
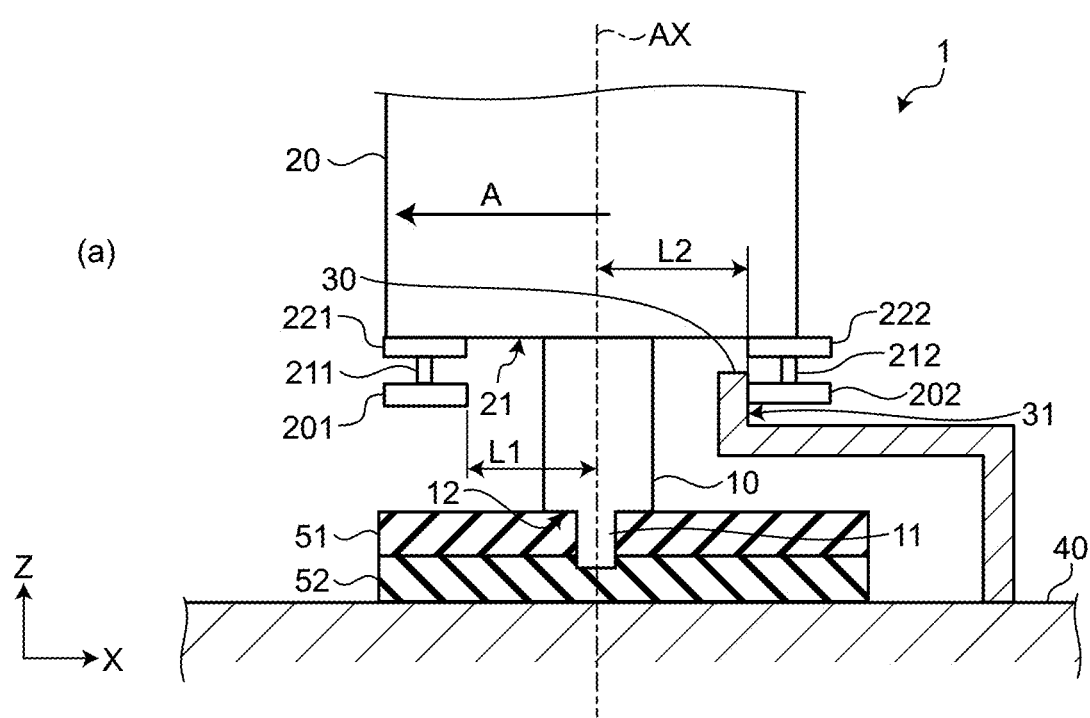
Figure 2:
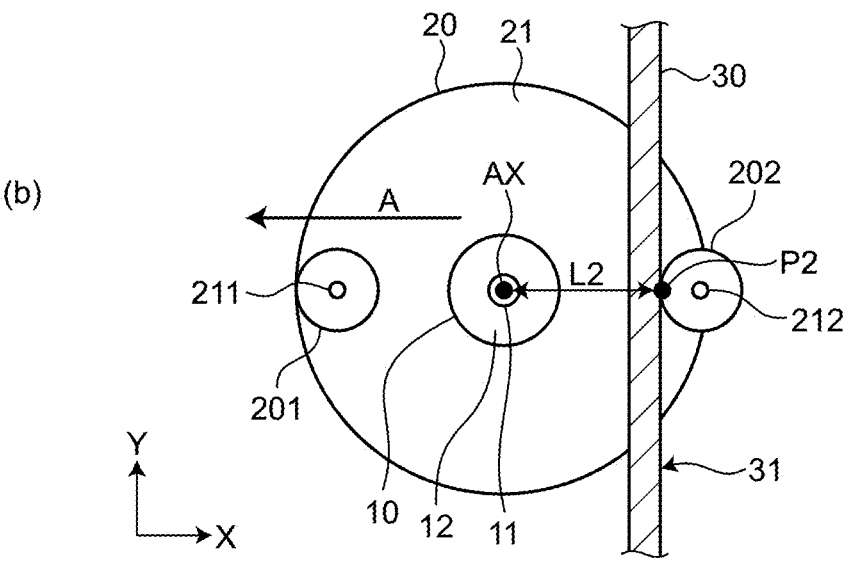
Figure 3:
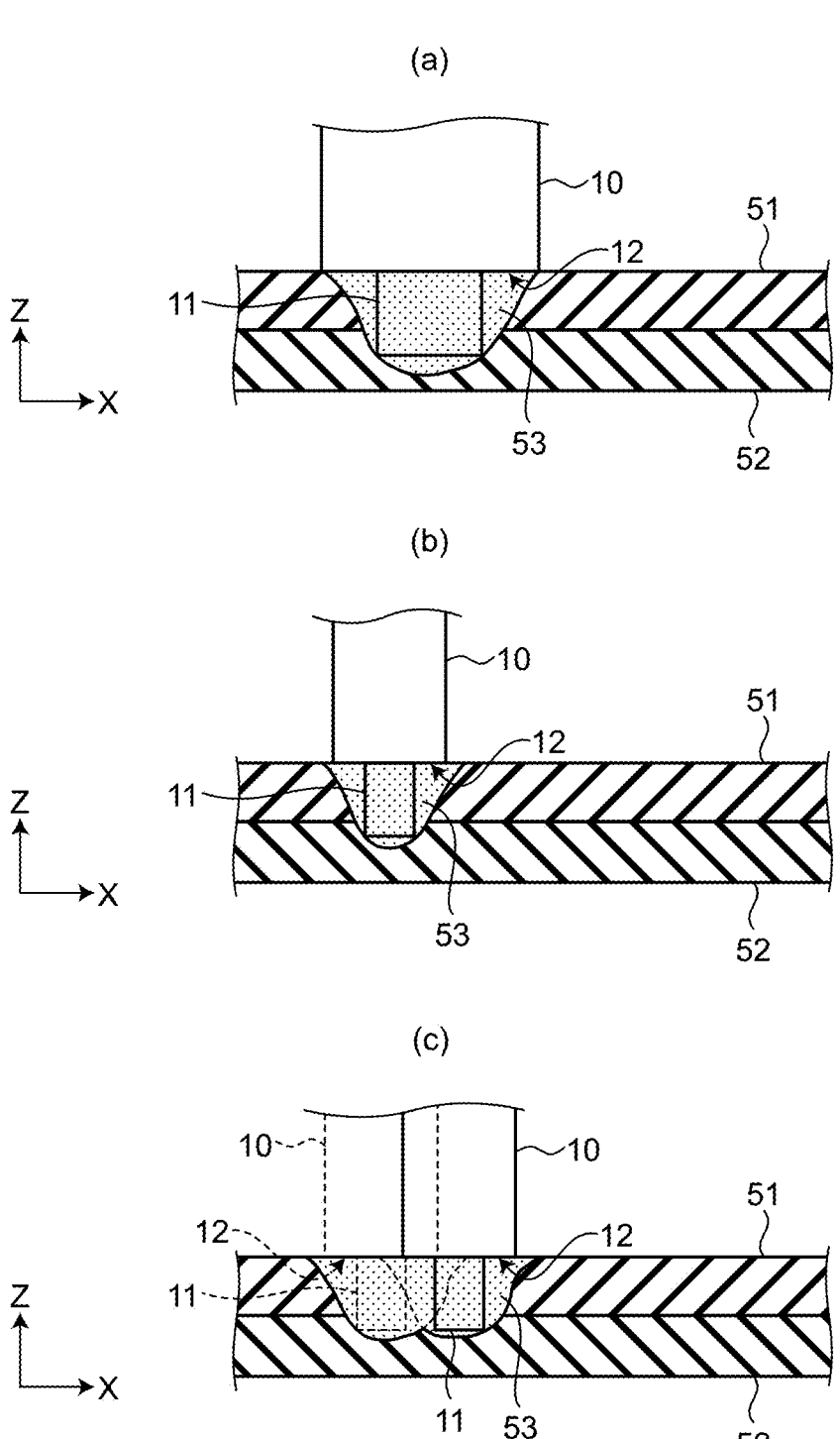
Figure 4:
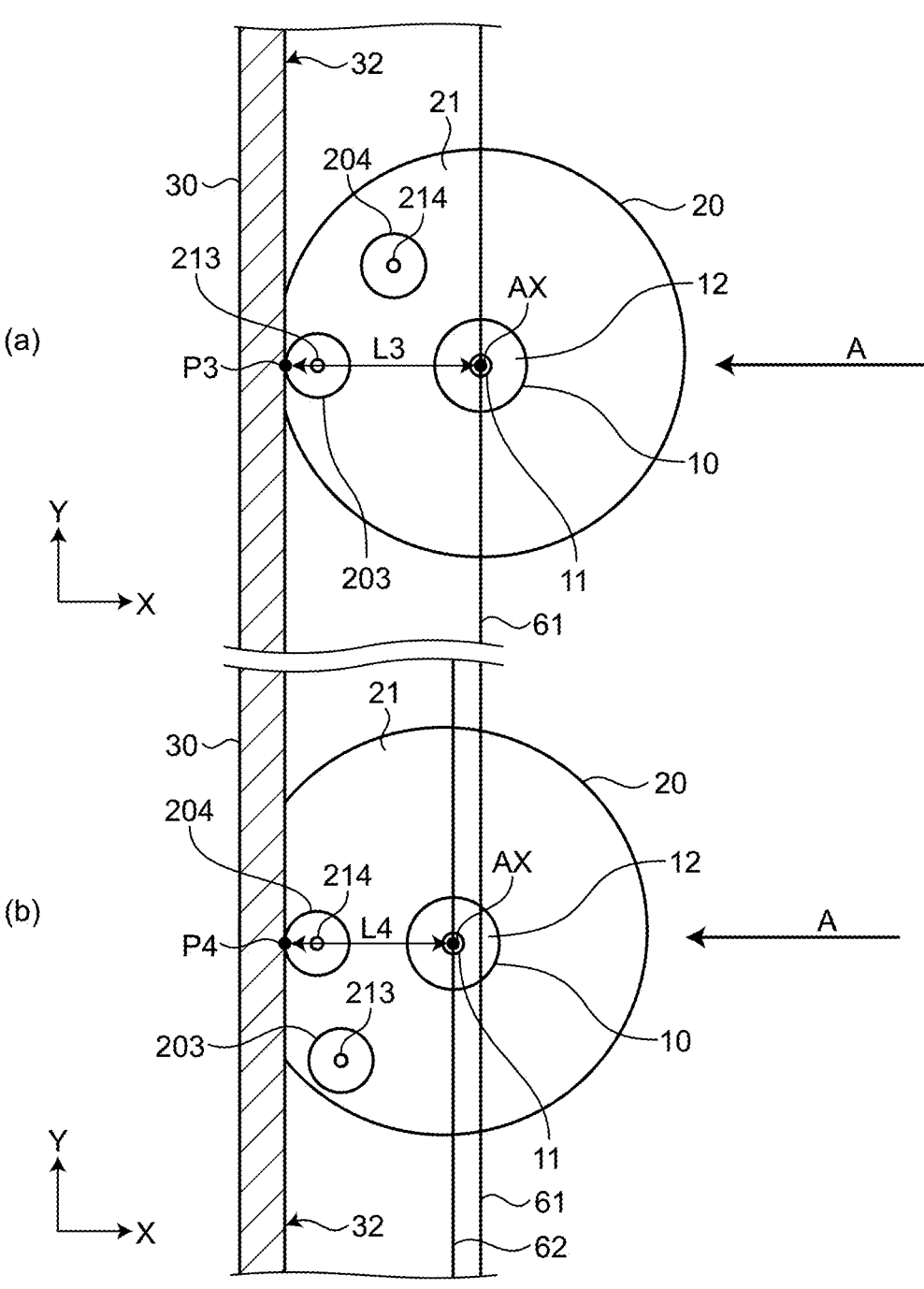
Figure 5:
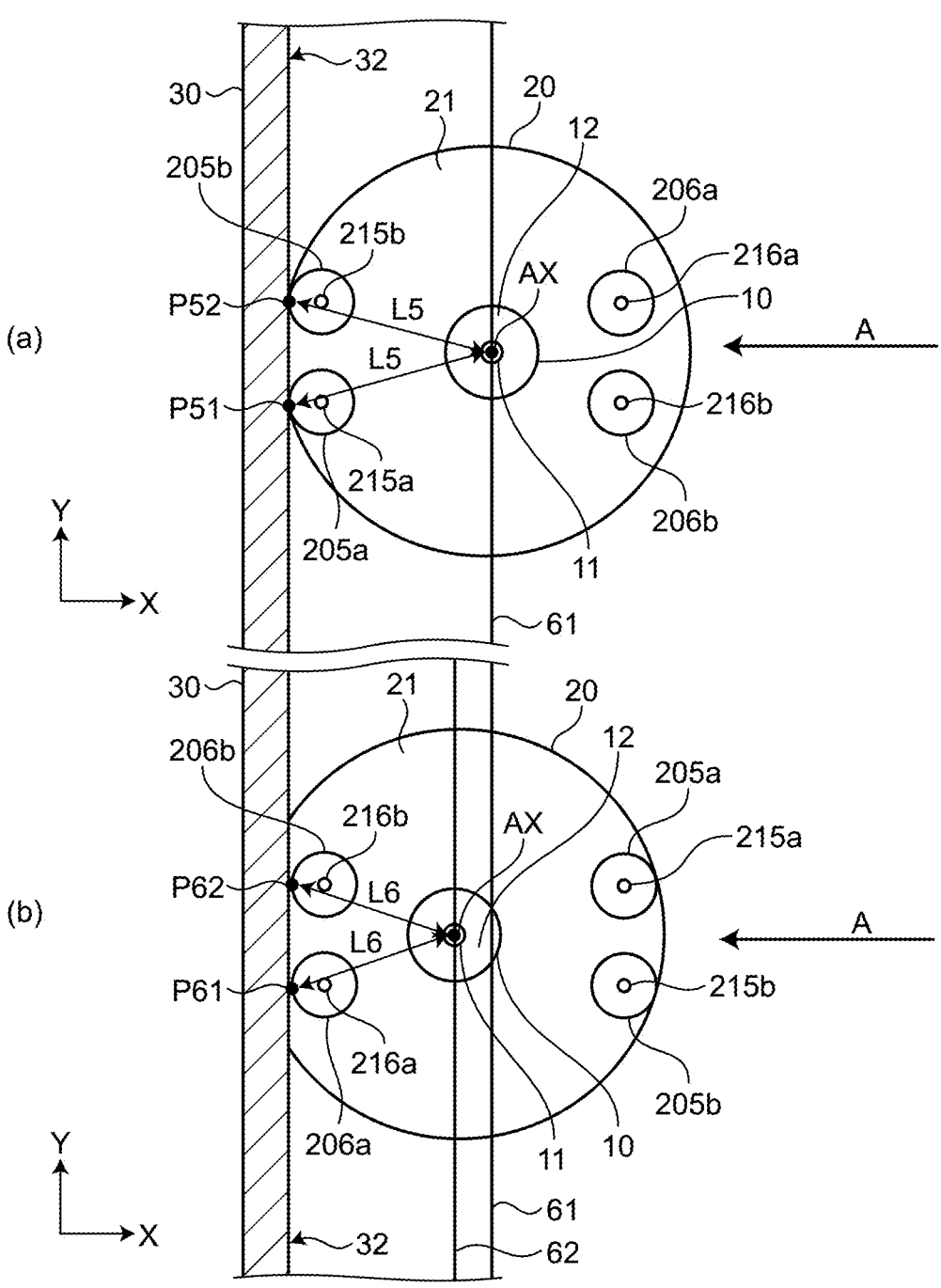

Part (a) of FIG. 2 is a diagram illustrating a state in which the friction stir welding apparatus according to the first embodiment, to join the two workpieces by a second friction stir welding;

Part (b) of FIG. 2 is a view of the joint tooling in a process of performing the second frictional stir welding from the axial line AX;

Part (a) of FIG. 3 is a diagram illustrating a state of friction stir welding in which a probe uses a thick welding tool;

Part (b) of FIG. 3 is a diagram illustrating a state of the first friction stir welding using the welding tool probe is thin;

Part (c) of FIG. 3 is a diagram illustrating a state of friction stir welding for the second time in which the probe uses a fine welding tool;

Part (a) of FIG. 4 is a view of a welding tool in a step of performing the first friction stir welding by the friction stir welding device according to a second embodiment from the axial line AX;

Part (b) of FIG. 4 is a view of the welding tool in ae step of performing the second friction stir welding by the friction stir welding device according to the second embodiment from the axial AX;

Part (a) of FIG. 5 is a view of the welding tool in a step of performing the first friction stir welding by the friction stir welding device according to a third embodiment from the axial line AX.

Figure 6:
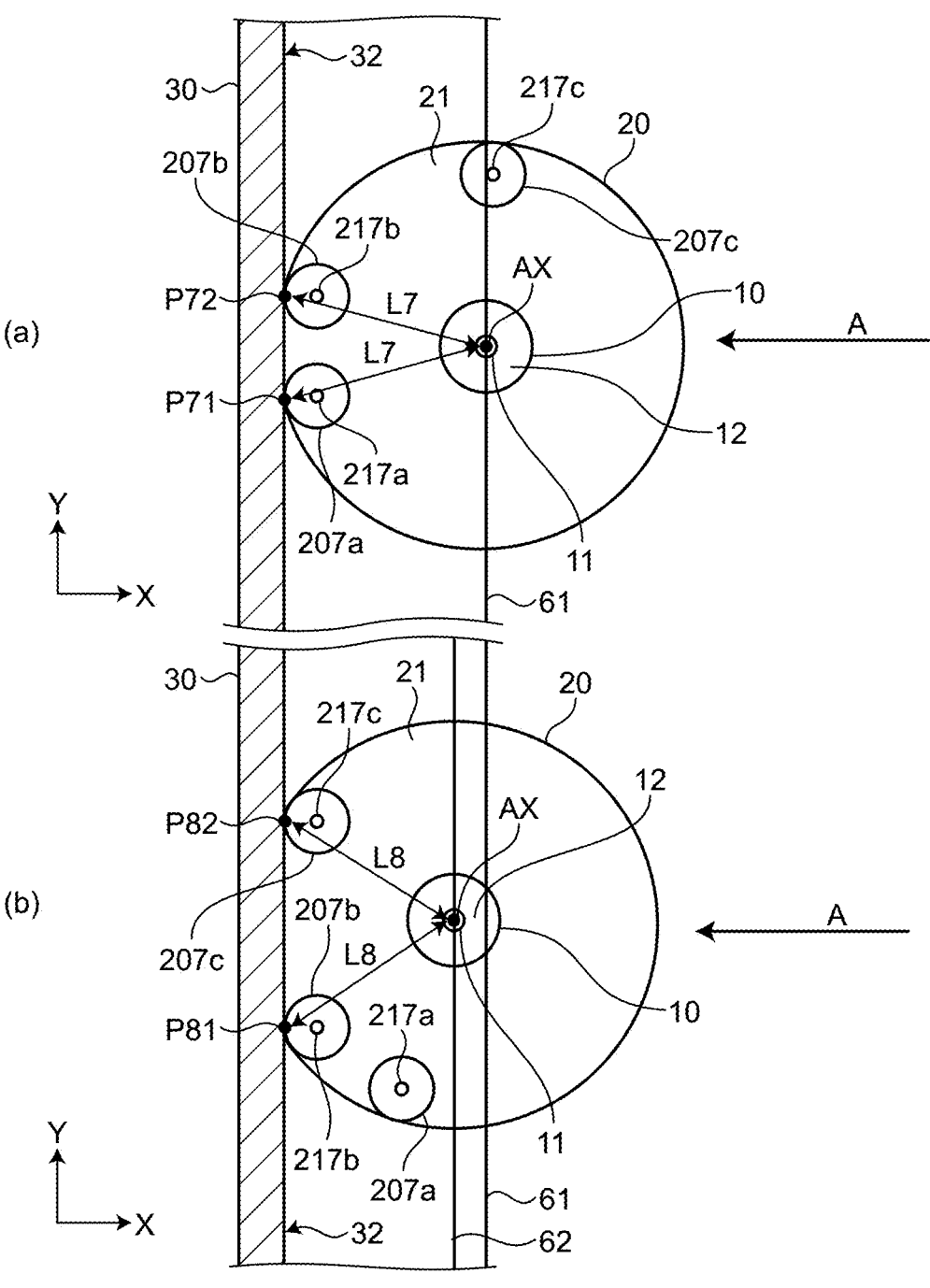

Part (b) of FIG. 5 is a view of the welding tool in a step of performing the second friction stir welding by the friction stir welding device according to the third embodiment from the axial line AX;

Part (a) of FIG. 6 is a view from the axial AX of the welding tool in a step of performing the first friction stir welding by the friction stir welding device according to a fourth embodiment; and Part (b) of FIG. 6 is a view of the welding tool in a step of performing the second friction stir welding by the friction stir welding device according to the fourth embodiment from the axial line AX.

DETAILED DESCRIPTION

In the friction stir welding in which a welding tool is given to an articulated robot arm, the locus of friction stir welding may deviate from the aim by the reaction force from a member to be joined, because the rigidity of an articulated robot arm is low. When performing a plurality of times by shifting the locus of joining the friction stir welding with respect to the same member to be joined, temporarily remove the guide rail for guiding the welding tool in a predetermined direction to adjust the position, it is necessary to perform work such as re-attaching the guide rail.

First Embodiment

Hereinafter, a first embodiment of a friction stir welding apparatus and a friction stir welding method according to the present disclosure will be described. Note that the present disclosure is not limited by this embodiment.

Figure 1:
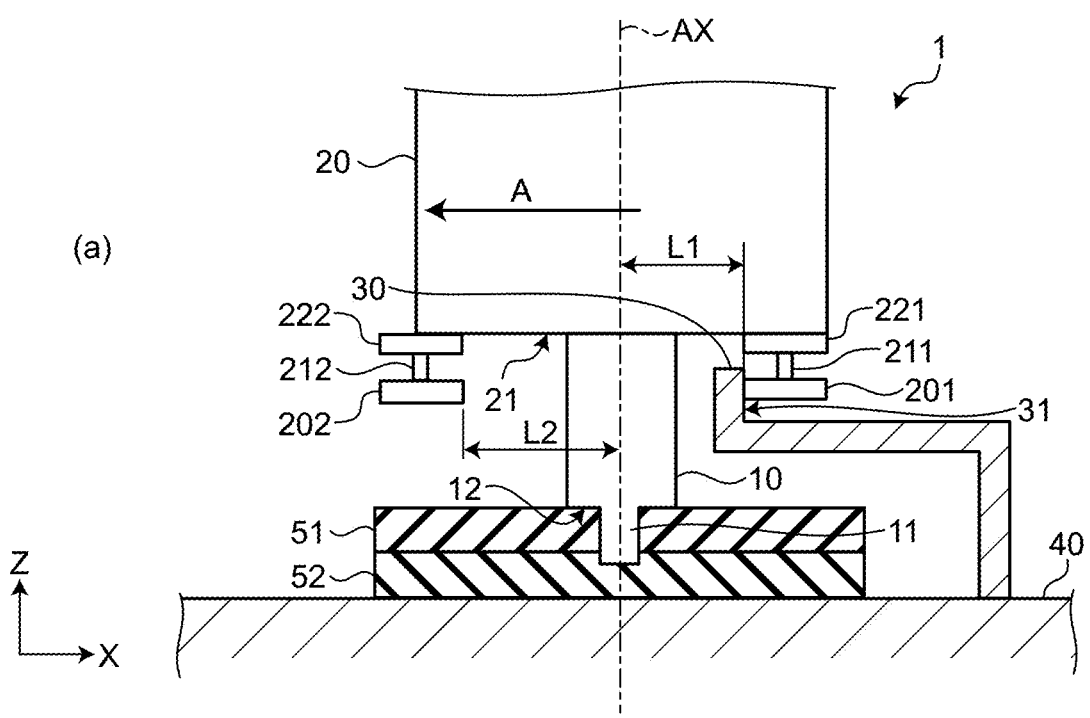
Figure 1:
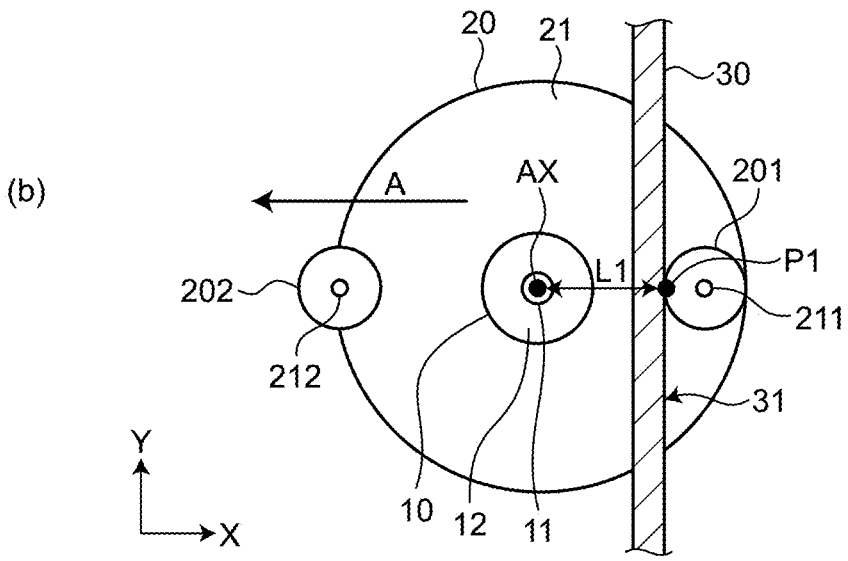

Part (a) of FIG. 1 is a diagram illustrating a state in which two workpieces 51 and 52 are joined by the first friction stir welding by the friction stir welding apparatus 1 according to the first embodiment. Part (b) of FIG. 1 is a view of the welding tool 10 in the process of performing the first friction stir welding from the axial AX. Incidentally, in part (a) of FIG. 1 and part (b) of FIG. 1, X-axis and Y-axis and axial perpendicular to each other are represented. Then, in the present embodiment, the +X direction and −X direction is referred to as the X-axis direction, the +Y direction and −Y direction is referred to as the Y-axis direction, and the +Z direction and −Z direction is referred to as the Z-axis direction. The X-axis and Y-axis and Z-axis in the other drawings correspond to the X-axis and Y-axis and Z-axis, respectively, of part (a) of FIG. 1 and part (b) of FIG. 1.

Part (b) of FIG. 2 is a diagram illustrating a state in which the friction stir welding apparatus 1 according to the first embodiment, welding the two workpieces 51 and 52 by a second friction stir welding. Part (b) of FIG. 2 is a view of the welding tool 10 in the process of performing the second friction stir welding from the axial AX.

In the friction stir welding apparatus 1 according to the first embodiment, the workpieces 51 and 52 are two members to be welded on the mounting table 40 are placed superimposed in the thickness direction. Then, while pressing the probe 11 to be described later while the welding tool 10 provided in the friction stir welding apparatus 1 is rotated at high speed to the workpieces 51 and 52, by moving linearly in a predetermined direction, the two workpieces 51 and 52 are welded by the friction stir welding.

The welding tool 10 is a cylindrical member used for friction-stir welding, where a probe 11 is provided at −Z end. The probe 11 is located at the center of −Z end face of the body portion of the welding tool 10 and protrudes −Z from the end face thereof. The probe 11 has a cylindrical external shape. Around the probe 11 at −Z end face of the welding tool 10 is referred to as a shoulder 12. As the material of the welding tool 10, a common material used as a material of the welding tool for friction stir welding, for example, steel, cemented carbide, and ceramics, or the like may be used.

The welding tool 10, the end face in the +Z direction is a main shaft is connected which is a rotation axis (not shown). Then, when rotating the welding tool 10 rotates the main shaft about the axial AX of the welding tool 10 by a rotation driving device having a motor (not shown). Further, the welding tool 10, with the movement of the rotation drive device, moves in a predetermined direction. In the present embodiment, for example, the rotation direction of the welding tool 10 is a clockwise direction. The moving direction of the welding tool 10 is a direction parallel to the +Y direction.

Further, the friction stir welding apparatus 1 according to the first embodiment includes a main shaft housing 20 which is a cylindrical sleeve for covering the main shaft coaxially with the main shaft. The main shaft and the main shaft housing 20 are relatively movable in the axial AX of the welding tool 10. Further, the main shaft housing 20 is non-rotating with respect to the rotation of the main shaft by the rotary drive device, for example, rotatably about the axial AX of the welding tool 10 by manual operation such as a worker, is held in the holding member (not shown).

On the −Z end face 21 of the main shaft housing 20, through the pedestals 221, 222 and the rotary shafts 211, 212, two cam followers 201,202 are provided as a plurality of roll members. The cam follower 201, 202 both diameters are the same disk-shaped, are rotatably supported respectively on the rotational shaft 211, 212 which are parallel to the axial AX of the welding tool 10. The cam follower 201 (rotate shaft 211) is disposed inside in the radial direction of the main shaft housing 20 than the cam follower 202 (rotary shaft 212).

In the friction stir welding apparatus 1 according to the first embodiment, for example, a welding tool 10, a main shaft housing 20, a main shaft, and a rotation driving device are mounted to the tip of an articulated robot arm as a friction stir welding unit.

Further, in the friction stir welding apparatus 1 according to the first embodiment, the guide rail 30 is provided on the surface on which the work 51 and 52 of the mounting table 40 is placed. The guide rail 30 is facing outward in the radial direction (X-axis direction) of the main shaft housing 20 has a guide surface 31 extending in the Y-axis direction. Then, the guide rail 30, by moving the welding tool 10 (main shaft housing 20) while in contact with the outer peripheral surface or the outer peripheral surface of the cam follower 202 of the cam follower 201 to the guide surface 31, the welding tool 10 (main shaft housing 20) to guide the Y-axis direction as a predetermined direction.

Here, in the radial direction of the main shaft housing 20, from the axial AX of the welding tool 10, the shortest distance to the contacting position P1 between the outer peripheral surface and the guide surface 31 of the cam follower 201 and the distance L1. Further, in the radial direction of the main shaft housing 20, from the axial AX of the welding tool 10, the shortest distance to the contacting position P2 between the outer peripheral surface and the guide surface 31 of the cam follower 202 and the distance L2. Then, in the friction stir welding device 1 according to the first embodiment, as the distance L1 and the distance L2 differ, specifically so that the distance L2 is longer than the distance L1, the cam follower 201 (rotate shaft 211) and the cam follower 202 (rotation shaft 212) and are arranged.

In the step of performing the first friction stir welding, as illustrate in part (b) of FIG. 1, when viewed from the axial AX of the welding tool 10, the guide rail 30 is disposed on the welding tool 10 side than the cam follower 201 in the radial direction of the main shaft housing 20. For example, in the process of performing the first friction stir welding, the operator manually moves the main shaft housing 20 in the axial AX direction or rotates the axial AX as a rotational center, the direction in which the welding tool 10 attempts to move (the direction of arrow A in FIG. 1) the opposite, the guide rail 30 between the welding tool 10 and the cam follower 201 in the radial direction of the main shaft housing 20 is positioned by contacting the cam follower 201 to the guide surface 31.

Further, in the step of performing the second friction stir welding, as illustrate in part (b) of FIG. 2, when viewed from the axial AX of the welding tool 10, the guide rail 30 is disposed on the welding tool 10 side than the cam follower 202 in the radial direction of the main shaft housing 20. For example, in the process of performing the second friction stir welding, the operator manually moves the main shaft housing 20 in the axial AX direction or rotates the axial AX as a rotational center, the direction in which the welding tool 10 attempts to move (the direction of arrow A in FIG. 2) the opposite, the guide rail 30 between the welding tool 10 and the cam follower 202 in the radial direction of the main shaft housing 20 is positioned by contacting the cam follower 202 to the guide surface 31.

Then, in the step of performing the first and second friction stir welding, under the force of the direction in which the welding tool 10 attempts to move (the direction of arrow A), while pulling the main shaft housing 20 in the direction of arrow A by the cam follower 201, 202, the guide rail 30 a movable configuration along. Therefore, it is possible to suppress the locus of the first friction stir welding and the locus of the second friction stir welding from deviating from the aim position by the reaction force from the works 51 and 52. Thus, in the friction stir welding apparatus 1 according to the first embodiment, the guide rail 30 is temporarily removed to adjust the position. It is not necessary to perform the work of mounting again, the friction stir welding for the same workpieces 51 and 52, easily first friction stir welding it can be performed by shifting the locus of the second friction stir welding.

Further, in the friction stir welding apparatus 1 according to the first embodiment, when the step of performing the first friction stir welding, while contacting the cam follower 201 to the guide surface 31, the probe 11 by rotating the welding tool 10 at high speed while pressing the workpieces 51 and 52, the welding tool 10 (main shaft housing 20) along the guide surface 31 to move. Thus, the locus of the first friction stir welding is a position L1 a distance from the guide surface 31 in the radial direction (X-axis direction) of the main shaft housing 20. Next, in the friction stir welding apparatus 1 according to the first embodiment, after the step of performing the first friction stir welding, when the step of performing the second friction stir welding, while contacting the cam follower 202 to the guide surface 31, the probe 11 by rotating the welding tool 10 at high speed while pressing the workpieces 51 and 52, the welding tool 10 (main shaft housing 20) along the guide surface 31 is moved. Thus, the locus of the second friction stir welding is a position L2 the distance from the guide surface 31 in the radial direction (X-axis direction) of the main shaft housing 20.

Then, in the friction stir welding device 1 according to the first embodiment, the locus of the first friction stir welding and the locus of the second friction stir welding are linear, so that the distance between the loci is 5 mm or less, and sets the distance L1 and the distance L2.

Part (a) of FIG. 3 is a diagram illustrating a state of friction stir welding using the probe 11 is thick welding tool 10. Part (b) of FIG. 3 is a diagram illustrating a state of the first friction stir welding using the probe 11 is a thin welding tool 10. Part (c) of FIG. 3 is a diagram illustrating a state of the second friction stir welding using the probe 11 is a thin welding tool 10.

In order to obtain a high welding strength in friction stir welding, it is necessary to increase the friction stir portion of the workpieces 51, 52 which is friction stir by the welding tool 10. Therefore, as illustrate in part (a) of FIG. 3, it is possible to obtain a large friction stir section 53 in the first friction stir welding if the probe 11 uses a thick welding tool 10. However, a large force is required for the probe 11 to push the thick welding tool 10 into the workpieces 51, 52, requiring large equipment (expensive). Therefore, the probe 11 can reduce the force to push the workpieces 51 and 52 than the thick welding tool 10, the probe 11 as illustrate in part (b) of FIG. 3 and part (c) of FIG. 3 using a thin welding tool 10. Then, the second friction stir welding is performed by slightly shifting from the locus of the first friction stir welding so that the distance between the locus of the first friction stir welding and the locus of the second friction stir welding is 5 mm or less. Thus, in the friction stir welding apparatus 1 according to the first embodiment, in a small facility (inexpensive), it is possible to obtain a friction stir portion 53 of the same order as when the probe 11 is used a thick welding tool 10, high welding strength it is possible to perform friction stir welding to obtain.

Second Embodiment

The following describes the second embodiment of the friction stir welding apparatus and the friction stir welding method according to the present disclosure. Incidentally, the same configuration as the first embodiment in the present embodiment will not be appropriately described.

Part (a) of FIG. 4 is a view of the welding tool 10 in the process of performing the first friction stir welding by the friction stir welding device 1 according to the second embodiment from the axial AX. Part (b) of FIG. 4 is a view of the welding tool10 in the process of performing the second friction stir welding by the friction stir welding device 1 according to the second embodiment from the axial AX.

In the friction stir welding apparatus 1 according to the second embodiment, through the pedestal and the rotary shafts 213, 214 (not shown) on the end face 21 of the main shaft housing 20, two cam followers 203, 204 are provided as a plurality of roll members. The cam followers 203, 204, both diameters are the same disk-shaped, are rotatably supported respectively on the rotational shafts 213, 214 which are parallel to the axial AX of the welding tool 10. The cam follower 203 (rotate shaft 213) is disposed outside in the radial direction of the main shaft housing 20 than the cam follower 204 (rotary shaft 214).

Further, in the friction stir welding apparatus 1 according to the second embodiment, the surface on which the work 51 and 52 of the mounting table 40 (not shown) is placed, the direction (arrow A direction in FIG. 4) in which the welding tool 10 is attempted to move in the radial direction of the main shaft housing 20, the guide rail 30 is provided. The guide rail 30 is facing inwardly in the radial direction of the main shaft housing 20 (X-axis direction), and has a guide surface 32 extending in the Y-axis direction. Then, the guide rail 30, while contacting the outer peripheral surface or the outer peripheral surface of the cam follower 202 of the cam follower 201 to the guide surface 32, while pressing the probe 11 to the workpieces 51 and 52 by rotating the welding tool 10, by moving the welding tool 10 (main shaft housing 20), the welding tool 10 (main shaft housing 20) to guide the Y-axis direction as a predetermined direction.

Here, in the radial direction of the main shaft housing 20, from the axial AX of the welding tool 10, the shortest distance to the contacting position P3 between the outer peripheral surface and the guide surface 32 of the cam follower 203 and the distance L3. Further, in the radial direction of the main shaft housing 20, from the axial AX of the welding tool 10, the shortest distance to the contacting position P4 between the outer peripheral surface and the guide surface 32 of the cam follower 204 and the distance L4. Then, in the friction stir welding device 1 according to the second embodiment, as the distance L3 and the distance L4 differ, specifically so that the distance L4 is shorter than the distance L3, the cam follower 203 (rotating shaft 213) and the cam follower 204 (rotating shaft 214) and arranged.

In the step of performing the first friction stir welding, as illustrate in part (a) of FIG. 4, when viewed from the axial AX of the welding tool 10, the cam follower 203 in the radial direction of the main shaft housing 20 is disposed on the welding tool 10 side than the guide rail 30. For example, in the process of performing the first friction stir welding, the operator manually moves the main shaft housing 20 in the axial AX direction or by rotating the axial AX as a rotational center, the same side as the direction in which the welding tool 10 attempts to move (the direction of arrow A), between the welding tool 10 and the guide rail 30 in the radial direction of the main shaft housing 20 cam follower 203 is positioned in contact with the guide surface 32.

Further, in the step of performing the second friction stir welding, as illustrate in part (b) of FIG. 4, when viewed from the axial AX of the welding tool 10, the cam follower 204 in the radial direction of the main shaft housing 20 is disposed on the welding tool 10 side than the guide rail 30. For example, in the process of performing the second friction stir welding, the operator manually moves the main shaft housing 20 in the axial AX direction or by rotating the axial AX as a rotational center, the same side as the direction in which the welding tool 10 attempts to move (the direction of arrow A), between the welding tool 10 and the guide rail 30 in the radial direction of the main shaft housing 20 cam follower 204 is positioned by contacting the guide surface 32.

Thus, in the step of performing the first and second friction stir welding, the welding tool 10 receives the force of the direction to be moved (arrow A direction), while pushing the main shaft housing 20 in the direction of arrow A by the cam followers 201, 202, along the guide rail 30 It becomes movable configuration. Therefore, the locus 61 of the first friction stir welding and the locus 62 of the second friction stir welding, it is possible to suppress the deviation from the aim position by the reaction force from the workpieces 51, 52. Thus, in the friction stir welding apparatus 1 according to the second embodiment, the guide rail 30 is temporarily removed to adjust the position, it is not necessary to perform the work of mounting again, the friction stir welding for the same workpieces 51 and 52, easily first friction stir welding locus 61 and the second friction stir welding it can be performed by shifting the locus 62.

Further, in the friction stir welding apparatus 1 according to the second embodiment, at the time of the step of performing the first friction stir welding, the welding tool 10 (main shaft housing 20) while in contact with the cam follower 203 to the guide surface 32 is moved along the guide surface 32. Thus, the locus 61 of the first friction stir welding is a position L3 a distance from the guide surface 32 in the radial direction of the main shaft housing 20 (X-axis direction). Next, in the friction stir welding apparatus 1 according to the second embodiment, after the step of performing the first friction stir welding, when the step of performing the second friction stir welding, the welding tool 10 (main shaft housing 20) while in contact with the cam follower 204 to the guide surface 32 It is moved along the guide surface 32. Thus, the locus 62 of the second friction stir welding is a position L4 a distance from the guide surface 32 in the radial direction of the main shaft housing 20 (X-axis direction).

Then, in the friction stir welding device 1 according to the second embodiment, the locus 61 of the first friction stir welding and the locus 62 of the second friction stir welding are linear, so that the distance between the loci is 5 mm or less, set the distance L3 and the distance L4. Thus, in the friction stir welding apparatus 1 according to the second embodiment, a small facility (inexpensive), it is possible to perform friction stir welding high welding strength is obtained.

*Third Embodiment*

The following describes the third embodiment of the friction stir welding apparatus and the friction stir welding method according to the present disclosure. Incidentally, the same configuration as the first embodiment in the present embodiment will not be appropriately described.

Part (a) of FIG. 5 is a view of the welding tool 10 in the process of performing the first friction stir welding by the friction stir welding device 1 according to the third embodiment from the axial AX. Part (b) of FIG. 5 is a view of the welding tool10 from the axial AX in the step of performing the second friction stir welding by the friction stir welding device 1 according to the third embodiment.

The friction stir welding device 1 according to the third embodiment, through the pedestal and the rotary shafts 215a, 215b, 216a, 216b (not shown) on the end face 21 of the main shaft housing 20, is provided with four cam followers 205a, 205b, 206a, and 206b as a plurality of roll members. The cam follower 205a and the cam follower 205b are arranged side by side in pairs. Further, the cam follower 206a and the cam follower 206b are arranged in pairs adjacent. Then, a pair of cam followers 205a, 205b and a pair of cam followers 26a, 26b are opposed across the welding tool 10 radially of the main shaft housing 20.

Further, in the friction stir welding apparatus 1 according to the third embodiment, the surface on which the works 51 and 52 of the mounting table 40 (not shown) is placed, the direction in which the welding tool 10 is attempted to move in the radial direction of the main shaft housing 20 (arrow A direction in FIG. 5) guide rail 30 is provided. The guide rail 30 is facing inwardly in the radial direction of the main shaft housing 20 (X-axis direction), and has a guide surface 32 extending in the Y-axis direction. Then, the guide rail 30, while contacting the outer peripheral surface or the outer peripheral surface of the cam followers 206a, 206b of the cam followers 205a, 205b to the guide surface 32, while pressing the probe 11 to the workpieces 51 and 52 by rotating the welding tool 10, by moving the welding tool 10 (spindle housing 20), the welding tool 10 (spindle housing 20) to guide the Y-axis direction as a predetermined direction.

Here, in the radial direction of the main shaft housing 20, from the axial AX of the welding tool 10, each of the shortest distance to the contact positions P51, P52 between the outer peripheral surface and the guide surface 32 of the cam followers 205a, 205b is given as distance L5. Further, in the radial direction of the main shaft housing 20, from the axial AX of the welding tool 10, each of the shortest distance to the contact positions P61, P62 between the outer peripheral surface and the guide surface 32 of the cam followers 206a, 206b is given as distance L6. Then, in the friction stir welding device 1 according to the third embodiment, as the distance L5 and the distance L6 differ, specifically so that the distance L6 is shorter than the distance L5, the cam followers 205a, 205b (rotating shafts 215a, 215b) and the cam followers 206a, 206b (rotating shafts 216a, 216b) are arranged.

In the step of performing the first friction stir welding, as illustrate in part (a) of FIG. 5, when viewed from the axial AX of the welding tool 10, the cam followers 205a,2 05b in the radial direction of the main shaft housing 20 is disposed on the welding tool 10 side than the guide rail 30. For example, in the process of performing the first friction stir welding, the operator manually moves the main shaft housing 20 in the axial AX direction or by rotating the axial AX as a rotational center, the same side as the direction in which the welding tool 10 attempts to move (the direction of arrow A) cam followers 205a, 205b between the welding tool 10 and the guide rail 30 in the radial direction of the main shaft housing 20 is positioned by contacting the guide surface 32. Then, when the process of performing the first friction stir welding, while contacting the cam followers 205a, 205b to the guide surface 32, while pressing the probe 11 to the workpieces 51 and 52 by rotating the welding tool 10, the welding tool 10 (main shaft housing 20) along the guide surface 32 to move.

Further, in the step of performing the second friction stir welding, as illustrate in part (b) of FIG. 5, when viewed from the axial AX of the welding tool 10, the cam follower 206a,206b in the radial direction of the main shaft housing 20 is disposed on the welding tool 10 side than the guide rail 30. For example, in the process of performing the second friction stir welding, the operator manually moves the main shaft housing 20 in the axial AX direction or by rotating the axial AX as a rotational center, the same side as the direction in which the welding tool 10 attempts to move (the direction of arrow A) cam followers 206a, 206b between the welding tool 10 and the guide rail 30 in the radial direction of the main shaft housing 20 is positioned by contacting the guide surface 32. Then, when the step of performing the second friction stir welding, while contacting the cam followers 206a, 206b to the guide surface 32, while pressing the probe 11 to the workpieces 51 and 52 by rotating the welding tool 10, the welding tool 10 (main shaft housing 20) along the guide surface 32 It is moved.

Thus, in the step of performing the first friction stir welding, the welding tool 10 receives the force of the direction to move (the direction of arrow A), while pushing the main shaft housing 20 in the direction of arrow A in the cam followers 205a, 205b, the guide rail 30 a movable configuration along. Similarly, in the process of performing the second friction stir welding, under the force of the direction in which the welding tool 10 attempts to move (the direction of arrow A), while pushing the main shaft housing 20 in the direction of arrow A in the cam followers 206a, 206b, it is movable configuration along the guide rail 30. Therefore, the locus 61 of the first friction stir welding and the locus 62 of the second friction stir welding, it is possible to suppress the deviation from the aim position by the reaction force from the workpieces 51, 52. Therefore, in the friction stir welding apparatus 1 according to the third embodiment, the guide rail 30 is temporarily removed to adjust the position, it is not necessary to perform the work of mounting again, the friction stir welding for the same works 51 and 52, easily first friction stir welding locus 61 and the second friction stir welding it can be performed by shifting the locus 62.

In the friction stir welding device 1 according to the third embodiment, the locus 61 of the first friction stir welding and the locus 62 of the second friction stir welding are linear, so that the distance between the loci is 5 mm or less, and sets the distance L5 and the distance L6. Thus, in the friction stir welding apparatus 1 according to the third embodiment, a small facility (inexpensive), it is possible to perform friction stir welding high welding strength is obtained.

Further, in the friction stir welding device 1 according to the third embodiment, by contacting the outer peripheral surface of the pair of cam followers 205a, 205b or the outer peripheral surface of the pair of cam followers 206a, 206b and the guide surface 32 of the guide rail 30, even if the rigidity of the mechanism for holding the welding tool 10 (such as an articulated robot arm) is low, since the main shaft housing 20 does not rotate, it is possible to keep the distance between the guide rail 30 and the welding tool 10 constant.

Fourth Embodiment

The following describes the fourth embodiment of the friction stir welding apparatus and the friction stir welding method according to the present disclosure. Incidentally, the same configuration as the first embodiment in the present embodiment will not be appropriately described.

Part (a) of FIG. 6 is a view of the welding tool 10 from the axial AX in the step of performing the first friction stir welding by the friction stir welding device 1 according to the fourth embodiment. Part (b) of FIG. 6 is a view of the welding tool 10 in the process of performing the second friction stir welding by the friction stir welding device 1 according to the fourth embodiment from the axial AX.

In the friction stir welding device 1 according to the fourth embodiment, three cam followers 27a, 27b, 27c are provided as a plurality of roll members through a pedestal and rotary shafts 217a, 217b, 217c (not shown) on the end face 21 of the main shaft housing 20. The cam followers 207a, 207b, 207c are both diameters are the same disk-shaped, are rotatably supported respectively in the rotational axes 217a, 217b, 217c parallel to the axial AX of the welding tool 10. The cam followers 207a, 207b, 207c (rotary shafts 217a, 217b, 217c) are arranged concentrically about the axial AX. Further, in the circumferential direction of the end face 21 of the main shaft housing 20, the distance between the cam follower 207b (rotary shaft 217b) and the cam follower 207c (rotary shaft 217c) is greater than the distance between the cam follower 207a (rotate shaft 217a) and the cam follower 207b (rotary shaft 217b).

Further, in the friction stir welding apparatus 1 according to the fourth embodiment, the surface on which the work 51 and 52 of the mounting table 40 (not shown) is placed, the direction in which the welding tool 10 is attempted to move in the radial direction of the main shaft housing 20 (arrow A direction in FIG. 6), where a guide rail 30 is provided. The Guide rail 30 is facing inwardly in the radial direction of the main shaft housing 20 (X-axis direction), and has a guide surface 32 extending in the Y-axis direction. Then, the guide rail 30, the outer peripheral surface of the cam followers 207a, 207b, or the outer peripheral surface of the cam followers 207b,207c, while contacting the guide surface 32, while pressing the probe 11 to the workpieces 51 and 52 by rotating the welding tool 10, by moving the welding tool 10 (main shaft housing 20), the welding tool 10 (main shaft housing 20) in the Y-axis direction as a predetermined direction.

Here, as illustrate in part (a) of FIG. 6, in the radial direction of the main shaft housing 20, from the axial AX of the welding tool 10, each of the shortest distance to the contact positions P71, P72 between the outer peripheral surface and the guide surface 32 of the cam followers 207a, 207b, the distance is L7. Further, as illustrate in part (b) of FIG. 6, in the radial direction of the main shaft housing 20, from the axial AX of the welding tool 10, each of the shortest distance to the contact positions P81, P82 between the outer peripheral surface and the guide surface 32 of the cam followers 207b, 207c, the distance is L8. Then, in the friction stir welding device 1 according to the fourth embodiment, so that the distance L7 and the distance L8 differ, are arranged cam followers 207a, 207b, 207c (rotary shafts 217a, 217b, 217c).

In the step of performing the first friction stir welding, as illustrate in part (a) of FIG. 6, when viewed from the axial AX of the welding tool 10, the cam followers 207a, 207b in the radial direction of the main shaft housing 20 is disposed on the welding tool 10 side than the guide rail 30. For example, in the process of performing the first friction stir welding, the operator manually moves the main shaft housing 20 in the axial AX direction or by rotating the axial AX as a rotational center, the same side as the direction in which the welding tool 10 attempts to move (the direction of arrow A) cam followers 207a, 207b between the welding tool 10 and the guide rail 30 in the radial direction of the main shaft housing 20 is positioned by contacting the guide surface 32. Then, when the process of performing the first friction stir welding, while contacting the cam follower 207a,207b to the guide surface 32, while pressing the probe 11 to the workpieces 51 and 52 by rotating the welding tool 10, the welding tool 10 (main shaft housing 20) along the guide surface 32 to move.

Further, in the step of performing the second friction stir welding, as illustrate in part (b) of FIG. 6, when viewed from the axial AX of the welding tool 10, the cam followers 207b, 207c in the radial direction of the main shaft housing 20 is disposed on the welding tool 10 side than the guide rail 30. For example, in the process of performing the second friction stir welding, the operator manually moves the main shaft housing 20 in the axial AX direction or by rotating the axial AX as a rotational center, the same side as the direction in which the welding tool 10 attempts to move (the direction of arrow A) cam followers 207b, 207c between the welding tool 10 and the guide rail 30 in the radial direction of the main shaft housing 20 is positioned by contacting the guide surface 32. Then, when the step of performing the second friction stir welding, while contacting the cam followers 207b, 207c to the guide surface 32, while pressing the probe 11 to the workpieces 51 and 52 by rotating the welding tool 10, the welding tool 10 (main shaft housing 20) is moved along the guide surface 32.

Thus, in the step of performing the first friction stir welding, the welding tool 10 receives the force of the direction to move (the direction of arrow A), while pushing the main shaft housing 20 in the direction of arrow A in the cam followers 207a, 207b, it is moveable along the guide rail 30. Similarly, in the process of performing the second friction stir welding, under the force of the direction in which the welding tool 10 attempts to move (the direction of arrow A), while pushing the main shaft housing 20 in the direction of arrow A in the cam follower 207b,207c, it is movable configuration along the guide rail 30. Therefore, the locus 61 of the first friction stir welding and the locus 62 of the second friction stir welding, it is possible to suppress the deviation from the aim position by the reaction force from the workpieces 51, 52. Therefore, in the friction stir welding apparatus 1 according to the fourth embodiment, the guide rail 30 is temporarily removed to adjust the position, it is not necessary to perform the work of mounting again, the friction stir welding for the same work 51 and 52, easily first friction stir welding locus 61 and the second friction stir welding it can be performed by shifting the locus 62.

Further, in the friction stir welding device 1 according to the fourth embodiment, the locus 61 of the first friction stir welding and the locus 62 of the second friction stir welding are linear, so that the distance between the loci is 5 mm or less, and sets the distance L7 and the distance L8. Thus, in the friction stir welding apparatus 1 according to the fourth embodiment, a small facility (inexpensive), it is possible to perform friction stir welding high welding strength is obtained.

According to an embodiment, the friction stir welding apparatus according to the present disclosure, the friction stir welding for the same member to be welded can be easily performed a plurality of times by shifting the locus of the welding.

According to an embodiment, the friction stir welding method according to the present disclosure, the friction stir welding for the same member to be bonded, can be easily performed a plurality of times by shifting the locus of the welding.

According to an embodiment, under the force of the direction the welding tool is attempted to move, it is possible to move along the guide rail while pulling the main shaft housing with the roll member configuration.

According to an embodiment, under the force of the direction the welding tool attempts to move, it can be configured to be movable along the guide rail while pressing the main shaft housing with the roll member.

According to an embodiment, it is possible to perform friction stir welding in which high welding strength can be obtained with small equipment (inexpensive).

According to the friction stir welding apparatus and the friction stir welding method according to the present disclosure, the friction stir welding for the same member to be welded, an effect is obtained that it is possible to perform multiple times by shifting the locus of the welding easily.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A friction stir welding apparatus comprising:
   a welding tool;
   a spindle housing covering a spindle connected to the welding tool;
   a plurality of roll members provided on the spindle housing; and
   a guide rail for guiding the welding tool in a predetermined direction by contacting any of the roll members among the plurality of roll members and a guide surface of the guide rail, wherein
   the plurality of roll members is arranged in a manner that, when viewed from an axial direction of the welding tool, a distance from an axis of the welding tool to a position where one of the roll members is in contact with the guide surface is different from a distance from the axis of the welding tool to a position where another roll member is in contact with the guide surface.

2. A friction stir welding method using the friction stir welding apparatus according to claim 1, the method comprising:
   a first friction stir welding step in which a first friction stir welding is performed on members to be welded by contacting any of the roll members among the plurality of roll members with the guide surface and moving the welding tool; and
   a second friction stir welding step in which, after the first friction stir welding step, a second friction stir welding is performed on members to be welded by contacting any other of the roll members among the plurality of roll members with the guide surface and moving the welding tool.

3. The friction stir welding method according to claim 2, wherein, when viewed from the axial direction of the welding tool, the guide rail is positioned closer to the welding tool side than the one or more roll members which are in contact with the guide surface.

4. The friction stir welding method according to claim 2, wherein, when viewed from the axial direction of the welding tool, the one or more roll members which are in contact with the guide surface are positioned closer to the welding tool side than the guide rail.

5. The friction stir welding method according to claim 2, wherein a locus of the first friction stir welding and a locus of the second friction stir welding are linear, and a spacing of the loci to each other is 5 mm or less.

* * * * *